Dec. 1, 1936.  G. LAUBE ET AL  2,062,585
MONITORING FINDER
Filed Oct. 22, 1935  2 Sheets-Sheet 1
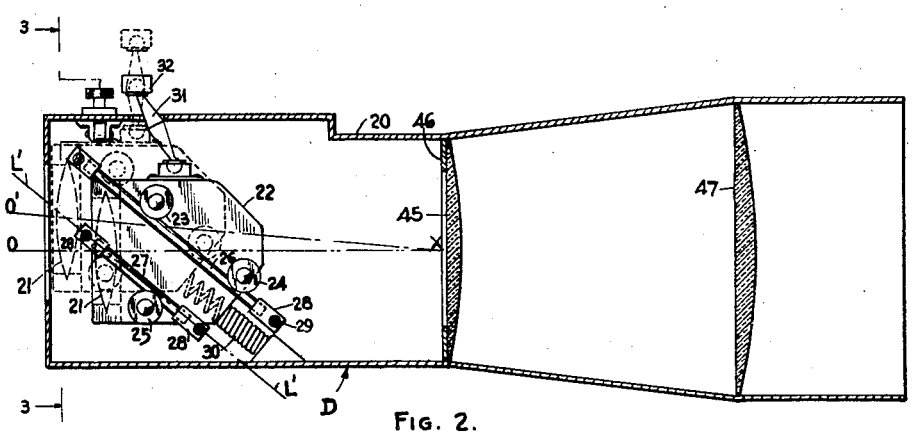
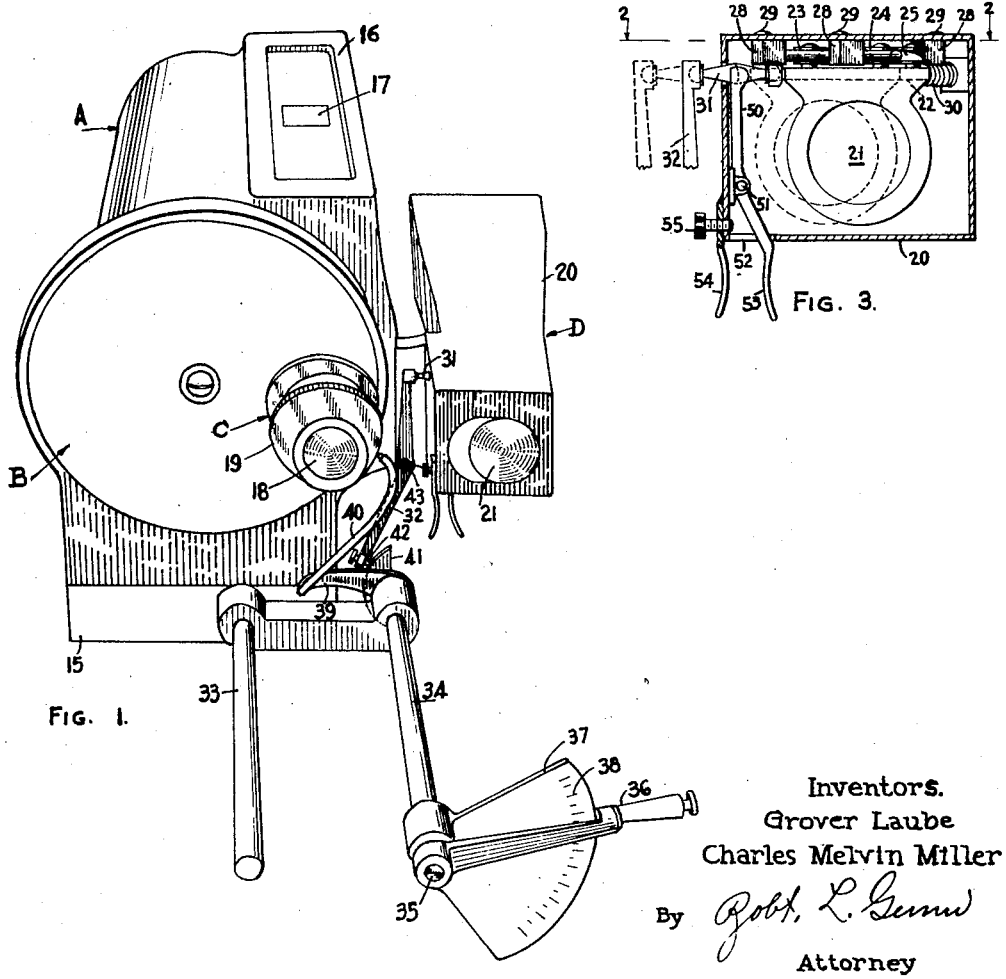
Inventors.
Grover Laube
Charles Melvin Miller
By Robt. L. Gunn
Attorney Dec. 1, 1936.    G. LAUBE ET AL    2,062,585
MONITORING FINDER
Filed Oct. 22, 1935    2 Sheets-Sheet 2

Inventors.
Grover Laube.
Charles Melvin Miller.
By Robt. L. Gunn
Attorney.

Patented Dec. 1, 1936

2,062,585

UNITED STATES PATENT OFFICE 2,062,585

MONITORING FINDER

Grover Laube and Charles Melvin Miller, Los Angeles, Calif., assignors to Twentieth Century-Fox Film Corporation, Hollywood, Calif., a corporation of New York Application October 22, 1935, Serial No. 46,100

11 Claims. (Cl. 95—44)

This invention relates to cinematography and deals with a monitoring finder adapted particularly for use with a motion picture camera.

In motion picture photography, it is customary to provide the camera with a focusing arrangement and a monitoring finder. In practice, the focusing arrangement is adapted to view directly through the photographing lens for focusing the same, and the monitoring finder is arranged to view the field externally of the camera while the action is taking place. With this arrangement it is possible to monitor the field being photographed by an outside lens arrangement. The difficulty with this arrangement, however, resides in the fact that the optical axes of the finder lens system and the photographing lens system must be separated. The separation of the two systems introduces parallax and a real displacement of objects in the monitoring field with respect to objects in the photographing field. Another objection, arising out of the separation of the optical axes of the two lens systems, is the discrepancy in field boundaries. It is obvious that if two lens systems having spaced, parallel optical axes are used, it becomes impossible to make the fields of the lenses coincide. This is a source of continuous annoyance to cinematographers and is especially annoying for close range "shooting". In photographing close ups where the field is extremely close, the displacement of objects in the finder focal plane with respect to objects in the photographing focal plane is so great as to present serious obstacles to accurate photography.

The present invention provides means for training one of the lenses, whereby an image in the finder focal plane may be made to assume its real position with respect to its place in the photographing focal plane, regardless of the distance of the field or the separation of the two lenses. It is to be understood, however, that with a separation between the optical axes of the finder lens and photographing lens, it is impossible to avoid parallax; but parallax may be reduced by bringing the two optical axes as close together as possible. Throughout the specification and claims, the term "field" will be used to denote the area of origin of the light contrast to be recorded, and the term "focal plane" will be used to denote the plane upon which the image of the light contrast is formed.

The concept of the present invention is based upon the fact that, if the optical axes of two lens systems are separated, one, or both, of the objectives may be laterally moved proportionally to the axial movement for focusing fields at various distances, thus bringing the two fields into coincidence. In our invention, we take advantage of this fact to move the monitor finder lens laterally with respect to the optical axis simultaneously with the axial movement of the lens for focusing. The arrangement is designed to cover focuses ranging from infinity to a close up. The means whereby we do this may take a variety of forms. In the preferred form of our invention, we provide a monitoring finder comprising a lens system arranged for use on the side of the camera case. As is obvious in this construction, there is a separation between the optical axis of the monitor finder and the principal axis of the photographing lens. It is to be understood that the axes are parallel, and that, when the respective fields are viewed through the finder lens and the photographing lens, there will be a real displacement of objects in the two fields, due to the separation of the lenses. In order to correct this displacement, we mount the finder lens upon a carriage, which is adapted to be moved laterally at the same time the lens is moved axially for focusing. The resultant path of movement of the optical center of the lens is substantially a straight line, having an angular relation to the optical axis of the lens that depends on the amount of separation of the two lenses and the focal length of the lens used in the finder system. In practice, the resultant movement of the lens has been reduced to a straight line. This is not theoretically correct, since the line of movement, in order to meet the theoretical conditions, should be the path of a parabola. However, since the movement of the lens, in its offset travel, takes place on the leg of the parabola, it becomes practical to use a straight line for this purpose, since the errors introduced are negligible.

It is, therefore, the primary object of this invention to provide a monitoring finder for a motion picture camera wherein lateral movement of the finder objective, with respect to the optical axis, is provided proportionally to the focusing movement of the lens to hold the photographing field and the finder field in substantial coincidence for all points of focus.

Another object of this invention is to provide a finder having an objective of the above described nature in combination with a motion picture camera having means for simultaneously focusing the photographing lens and the finder objective by a single operation. To those versed in the art of cinematography, it is known that focusing of the photographing lens is ordinarily brought about by remote control. The mechanism commonly employed for this purpose comprises a shaft having a crank at one end connected by means of a link to the objective of the photographing lens mount. On the other end of the shaft, a handle, or lever, is attached and extends to a point where it may be conveniently operated by hand. In practice, the lever works over a dial calibrated to show the positions of the handle for different focal lengths of the lens. With this arrangement, the lens may be brought to focus upon any distance, which would be indicated by the calibration indexed by the pointer on the handle. We utilize this shaft and handle to focus the finder lens simultaneously with the photographing lens. The construction for this purpose may take a variety of forms. In the form shown, we employ a lever and cam arrangement. By means of the lever and the cam, we are enabled to move the finder lens any proportional amount of the movement of the photographing lens, and, by properly designing the cam and lever, we can provide for lenses of different focal lengths, thus adapting the system so that lenses of any focal length may be used.

In the above described construction, it is to be understood that the image receiving plane in the finder system remains fixed, and that the field boundaries on the plane are defined by a fixed matte. Also, as the finder lens moves axially for focusing and at the same time moves laterally to compensate for the displacement of the objects in the finder focal plane, with respect to the photographic focal plane, the lens is held parallel to the finder image receiving plane. In an arrangement of this nature, the finder field and the photographing field are held in constant coincidence regardless of focus, and the finder lens is simultaneously focused on the same field as the photographing lens.

In using the above arrangement for taking close "shots", it is evident that background parallax would become very pronounced due to the crossing of the lines of sight at the point of focus. Since it is essential that the cinematographer should know at all times just what background will be included in every shot, it is an object of this invention to provide means whereby a quick reference may be had through the finder system on the background covered by the photographing lens regardless of the focus.

Other objects and advantages will appear as the description proceeds in conjunction with the drawings in which:

Figure 1 is a fragmentary perspective view of a motion picture camera, showing the manner in which our finder would be installed.

Figure 2 is a longitudinal sectional view of the finder, taken on line 2—2 of Figure 3.

Figure 3 is a cross section of the finder, taken on line 3—3 of Figure 2.

Figure 4:
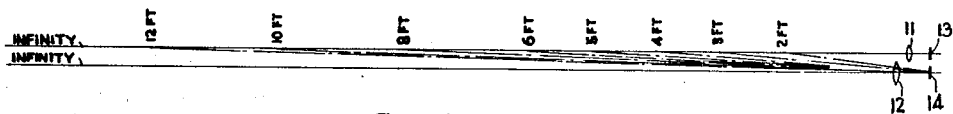
Figure 4 is a diagram showing the correction accomplished by our invention.

In the drawings we have illustrated both the principle and the structure embodied in our invention. Before going into a description of the structure, a short explanation relative to the principle involved will be entered.

In Figure 4 we have shown a pair of lenses, designated 11 and 12. In this view, the lens 11 will be assumed to be the camera photographing lens, and lens 12 will be termed the finder lens, or objective. As is well known, when these lenses are focused on infinity they will be positioned the exact focal length of each lens from their respective focal planes, designated 13 and 14 respectively. As the field is brought nearer to the lenses, the lenses will be moved outwardly to bring the planes 13 and 14 into correct focus. In practice, the planes 13 and 14 represent the film plane of the camera and the ground-glass plane of the finder. These planes are ordinarily separated by several inches, and, as has been mentioned hereinbefore, introduce field boundary errors and displacement of objects in the two fields. We conceived the idea of moving the finder lens laterally, as well as axially, when focusing on various distances. In Figure 4 we have shown a plurality of fields of different distances, and have shown how the angle of the line of sight in the finder lens should change, as the fields are brought nearer the lens, to make the fields coincide. In other words, if the lenses 11 and 12 are to cover the same fields, it is obvious that one or both of the lenses should be moved laterally, as well as forwardly, in order to cross their lines of sight at the point of focus. In this respect, it is to be understood that lenses of different focal lengths are used for photographing, that the focal plane 13 is fixed by the size of the frame aperture in the camera, and that, accordingly, the boundaries of the fields for different distances are determined by the focal length of the photographing lens used. It is also to be understood that the size of the focal plane 14 depends upon the focal length of the lens used in the finder system and upon the field boundaries as determined by the photographing lens. In using lenses of different focal lengths for focusing on the same field, with the size of the focal plane of each fixed, it is easy to show that the field boundaries vary slightly for different field distances. If the boundaries of the two fields are made substantially equal at a field distance of, say, 50 feet, it will be found that the slight discrepancy in boundaries caused by other field distances will be negligible. In practice, the size of the focal plane 14 is predetermined from the above mentioned factors, and defined by a matte placed in front of the focal plane. With the focal plane of the finder lens fixed, any lateral movement of the finder lens will cause a corresponding movement of the field. The result is a field shift which will bring the field of the finder into coincidence with the field of the photographing lens. This is one of the objects sought to be accomplished in this invention.

Figure 5:
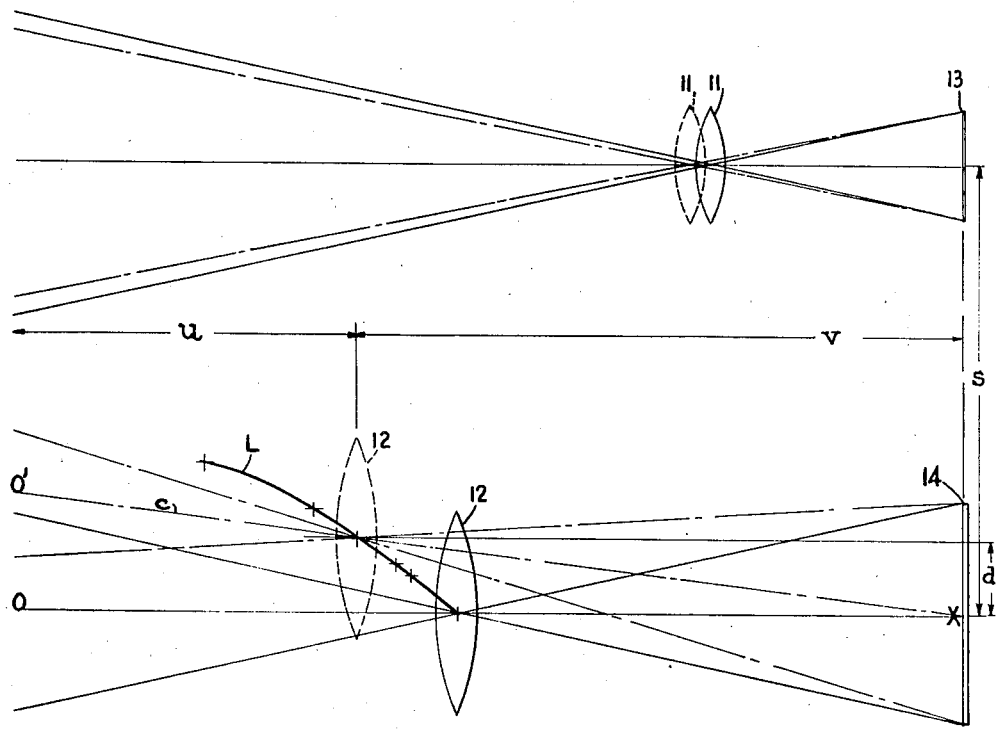
Figure 5 is a schematic arrangement of lenses, showing the manner in which we offset the finder lens to provide the corrections shown in Figure 4.

In Figure 5 we have shown how the line of movement for the finder lens was developed. The same numbers will be used to designate like parts in this view. If we let "$s$" equal the separation of the optical axes of the two lens system, "$v$" the focal length of the finder lens for variable field distances, "$u$" the field distance, and "$d$" the lateral displacement of the finder lens, we can reduce these elements to the formula $$d = \frac{sv}{u+v}$$

Now, by plotting the values of "$d$" against corresponding values of "$v$", the position of the finder lens may be found for fields of various distances. The locus of these points resolves itself into a line designated L. As will be noted, this line is not a straight line, but, since the movement of the lens 12 takes place on a substantially straight portion of this line for focuses ranging from infinity to two feet, it has been found that a straight line movement of the lens provides a satisfactory working arrangement. In Figure 5, the solid lines indicate the positions of the lenses for focus on infinity, and the dotted lines indicate the positions for a focus on two feet. The other working focuses range between these two points. If a line "$c$" is passed from the center of the focal plane 14 through the optical center of the finder lens, it will cross the line of sight of the photographing lens at substantially a two-foot focus on that lens. This will bring the two fields into coincidence, and the movement of the lens 12 along the line L has been so designed that the fields are in constant coincidence and the lenses are in exact focus on the same field, regardless of the field distance.

The above has been entered as an explanation of the end to be obtained in this invention. The following will be entered as a description of the means for accomplishing this end.

In Figures 1, 2, and 3, we have shown a device for the purpose described. Referring to Figure 1, it will be seen that we have fragmentarily illustrated, in perspective, the front end of a motion picture camera. In this view, A designates the camera case and B designates the conventional turret used in motion picture photography. The camera case A is provided with a base plate 15 adapted to be mounted on any suitable support, such as a tripod, or a camera carriage. The case A carries a face 16 for mounting film magazines, and is also equipped with a hole 17, adapted to permit film to enter and leave the case from the magazine. The turret B is provided with a lens mount generally designated C, said lens mount being attached to the turret B in the conventional manner and having a lens 18 therein. The lens 18 will sometimes hereinafter be termed the photographing lens. Means is provided for focusing the lens 18, and, in the form shown, comprises a ring 19 adapted to be turned on the lens mount C. The means for turning the ring 19 will be described later in conjunction with the means to be described for focusing the finder. Mounted on the case A is a finder generally designated D. The finder D may be mounted upon the case in any suitable convenient manner, the details of which are not shown. In the form of finder shown, it will be seen to comprise a finder tube 20, having a lens 21 mounted therein. The lens 21 will be termed hereinafter the objective of the finder, and the finder will sometimes be called a monitoring finder. In conformance with one of the objects of this invention to laterally move the objective of the finder proportionally to the movement of the objective for focusing, means is provided for moving the objective in this manner simultaneously with the focusing of the photographing lens. One form of means provided for this purpose is illustrated in Figures 1, 2, and 3.

In Figure 2 the finder tube 20 is shown carrying the objective 21. The means for mounting the lens 21 in the tube 20, to accomplish the objects set forth, may take a variety of forms. In the preferred form of our invention, we mount the lens 21 upon a plate 22 which may be called a carriage. The plate 22 is equipped with rollers 23, 24, and 25 on the upper surface thereof. The rollers, in turn, are grooved and are supported upon a track comprising rails 26 and 27, said rails being supported by blocks 28 carried on the wall of the finder in any suitable manner, such as by screws 29. It will be observed that the rails 26 and 27 bear an angular relation to the principal axis OX of the lens 21. The axis OX, in this instance, is the line of sight when the lens is focused on infinity, and the angular relation of the rails 26 and 27, which is defined as the relation of the line L' to this axis, will be found to be the same as the angular relation of the straight line portion of the line L in Figure 5 to the principal axis of the lens 12 when focused on infinity. Means is provided for moving the carriage 22 on the rails 26 and 27, and, as shown in Figures 2 and 3, may comprise a spring 30 arranged to normally exert a force tending to move the carriage outwardly on the rails. As a counteracting force to the force of the spring, we connect an arm 31, having a ball and socket joint on each end thereof, to the carriage 22 and to the upper end of a lever 32. In Figures 2 and 3 the full lines represent the position when the lens is focused on infinity and the dotted lines represent the position when the lens is focused substantially on two feet. The line of sight for the two-foot focus is along the line O'X. The other focuses from infinity to two feet range between these two points. The movement of the lens 21 is brought about by means of the lever 32. The means for moving the lever 32 is co-ordinated with the means for focusing the photographing lens, and is illustrated in Figure 1. In this view we show means whereby the photographing lens and the finder lens may be focused simultaneously by a single operation. Here it will be observed that the front end of the camera carries a pair of rods 33 and 34 suitably mounted thereon. These rods are for the purpose of supporting a matte box in front of the lens 18. One of the rods, 34, is a hollow rod and is provided with a telescoping shaft 35 which extends through the rod 34 and, at its outer end, carries a handle 36, suitably attached thereto, which swings over a dial 37 carrying calibrations 38 for indicating the positions of various focuses of the lens 18. On the other end of the rod there is mounted a crank arm 39, to the outer end of which is connected a link 40. The other end of the link 40 is universally connected to the focusing ring 19 of the lens mount C. Also, on the inner end of the rod 35, we mount a cam 41, adapted to engage a cam follower 42 on the lower end of the lever 32. The lever 32 is pivotally mounted at an intermediate point 43 on the finder.

In operation, the focusing of the photographing lens and the finder objective is accomplished by means of the handle 36, and, by virtue of the foregoing described structure, the lenses are simultaneously focused on substantially identical fields. For example, if the field is brought to a close-up, say two feet, the lens 18 is focused on two feet and the lens 21 is likewise focused on the same field, and, at the same time, is moved laterally to the dotted line position shown in Figures 2 and 3. Theoretically, this moves the principal axis of the lens and carries the image, cast by the lens upon a ground glass plane 45, laterally across the plane and proportionally to the movement of the lens. Since, as before explained, it is customary to fix the focal plane boundaries of the finder on the ground glass 45 by means of a fixed matte 46, it will be appreciated that the lateral movement of the lens, in effect, moves the field boundaries. In this manner, the fields of the photographing lens and the finder lens may be brought into substantial coincidence. The ground glass may be provided with a lens on the rear side thereof, and the tube 20 may carry a magnifying lens 47 for viewing the image on the glass.

In the drawings and description, we have dealt with a simple convex lens. However, the principles involved may be applied equally as well to a compound lens system having a negative element and/or inverting prisms. In each instance, the amount and direction of lateral movement would be a separate calculation.

As previously mentioned, it is one of the objects of this invention to provide means for obtaining a quick reference on the background being photographed on all shots. In using two spaced parallel optical systems wherein one of the systems is trained to make the fields coincide at all points of focus, it is obvious that the backgrounds covered by the two systems cannot be the same. However, it is necessary that the cinematographer have some way of checking the background that will appear in the picture. This is accomplished by throwing the finder objective back to the position for focus or infinity. In Figures 2 and 3 we show means for this purpose.

In Figure 3, it will be seen that a lever 50 is pivoted on the finder tube 20 by means of a bracket 51. The upper end of the lever is adapted to engage an edge of the plate 22, and the lower end of the lever extends through a slot 52 in the bottom of the tube 20 and may be curved as shown at 53 for gripping purposes. The lever 50 is freely suspended on its pivot and is arranged to cause no interference with the movement of the plate except when operated. In order to provide convenience, we mount an opposed finger plate 54 on the tube 20 in any suitable manner and incorporate a set screw 55 that serves as a stop for the lever. To operate the device, it is merely necessary to pinch the members 53 and 54 together whereupon the plate 22 is thrown backwards against the spring 30 and the lens 21 is carried back to the position for focus on infinity. The set screw 55 stops the movement of the plate at the proper point. The operator may then view through the finder system and ascertain the background that would be covered by the photographing lens. The operation of the lever 50 also operates the lever 32 and raises the cam follower 42 off the cam 41. Upon releasing the lever 50, the spring 30 pushes the plate 22 back into the former position of focus for the lens 21 and returns the follower 42 to the cam 41. With a device of this nature, the operator may take a quick reference on the background actually being photographed without disturbing any other part of the camera.

The structure shown and described is to be considered as one form of means for accomplishing the objects set forth in this invention. The invention, therefore, should not be limited to the particular type of means shown.

We claim:

1. For use with a motion picture camera: a monitor finder comprising a casing; a track within said casing; a movable carriage supported on said track; an objective mounted upon said carriage, and means for moving said carriage along said track to focus said objective.

2. For use with a motion picture camera: a monitor finder comprising a casing; a track within said casing; a movable carriage supported on a track; an objective mounted upon said carriage, said track being arranged in angular relation to the principal axis of said objective, and means for moving said carriage along said track to focus said objective.

3. For use with a motion picture camera: a monitor finder comprising a casing; a pair of rails mounted in said casing; a carriage having an objective mounted thereon; means for movably supporting said carriage upon said rails, and means for moving said carriage on said rails to focus said objective.

4. The structure of claim 3 wherein said last mentioned means includes a lever connected to the carriage and means for moving said lever.

5. The structure of claim 3 wherein said last mentioned means includes a lever connected to said carriage; means for moving said lever to move said carriage, and a spring arranged to exert a counter yieldable force against the movement of said carriage.

6. In a motion picture camera, the combination of: a photographing lens; a separate finder objective; means for focusing said photographing lens, and means controlled by said first mentioned means for focusing said finder objective, said first mentioned means including a rotatable shaft, and said second mentioned means including a lever connected to said objective, and a cam on said shaft adapted to work said lever.

7. In a motion picture camera, the combination of: a photographing lens and a separate finder objective having their principal axes parallel; a movable carriage for supporting said finder objective, the line of movement of said carriage bearing an angular relation to the principal axis of said objective, and means for simultaneously focusing said photographing lens and moving said carriage to focus said objective and move the same laterally.

8. In a motion picture camera, the combination of: a photographing lens; a separate finder objective; means for laterally moving said finder objective proportionally to the focusing movement thereof; means for jointly focusing said finder objective and said photographing lens, and means for optionally moving said finder objective for a reference on the background of said photographing lens.

9. In a motion picture camera, the combination of: a photographing lens; a separate finder objective; means for jointly focusing said photographing lens and said finder objective on the same field, said means embodying a structure for laterally moving said finder objective proportionally to the focusing movement thereof, and means for optionally moving said finder objective for a reference on the background of said photographing lens.

10. In a motion picture camera, the combination of: a photographing lens; a finder objective, said finder objective and said photographing lens having spaced parallel optical axes; means for jointly focusing said finder objective and said photographing lens on the same field, said means embodying a structure for laterally moving said finder objective proportionally to the focusing movement thereof, and means for optionally moving said finder objective back to its original position for a reference on the background of said photographing lens.

11. In a motion picture camera, the combination of: a photographing lens; a separate finder lens; a rotatable shaft supported on said camera; an arm on said shaft; a link connecting said arm to said photographing lens and adapted to move said lens axially upon rotation of said shaft; a cam on said shaft, and a lever pivotally mounted on said camera, one end of said lever being arranged to engage said cam and the other end being connected to said finder lens and adapted to move the same axially upon rotation of said shaft.

GROVER LAUBE.
CHARLES MELVIN MILLER.